US008401028B2

(12) United States Patent
Mihaly et al.

(10) Patent No.: US 8,401,028 B2
(45) Date of Patent: Mar. 19, 2013

(54) SELECTION OF AN EDGE NODE IN A FIXED ACCESS COMMUNICATION NETWORK

(75) Inventors: Attila Mihaly, Dunakeszi (HU); Andras Csaszar, Budapest (HU); Oktavian Papp, Tinnye (HU); Lars Westberg, Enkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 297 days.

(21) Appl. No.: 12/863,872

(22) PCT Filed: Jan. 23, 2008

(86) PCT No.: PCT/EP2008/050748
§ 371 (c)(1), (2), (4) Date: Jul. 21, 2010

(87) PCT Pub. No.: WO2009/092441
PCT Pub. Date: Jul. 30, 2009

(65) Prior Publication Data
US 2010/0309784 A1 Dec. 9, 2010

(51) Int. Cl.
*H04L 12/28* (2006.01)
(52) U.S. Cl. ........................ 370/400; 370/410
(58) Field of Classification Search ............ None
See application file for complete search history.

(56) References Cited

U.S. PATENT DOCUMENTS

| | | | |
|---|---|---|---|
| 2002/0120745 A1* | 8/2002 | Oishi et al. | 709/226 |
| 2004/0218548 A1* | 11/2004 | Kennedy et al. | 370/254 |
| 2005/0099964 A1* | 5/2005 | Delaney et al. | 370/254 |
| 2005/0210137 A1* | 9/2005 | Taguchi | 709/227 |
| 2007/0245007 A1 | 10/2007 | Tsirtsis et al. | |
| 2008/0019363 A1* | 1/2008 | Kitajima | 370/391 |
| 2008/0192668 A1* | 8/2008 | Okubo et al. | 370/312 |
| 2008/0267116 A1* | 10/2008 | Kang et al. | 370/328 |
| 2008/0310299 A1* | 12/2008 | Saleh et al. | 370/221 |
| 2009/0103533 A1* | 4/2009 | Li et al. | 370/389 |
| 2010/0284407 A1* | 11/2010 | Leelanivas et al. | 370/392 |

FOREIGN PATENT DOCUMENTS

| | | |
|---|---|---|
| EP | 1587272 A1 | 10/2005 |
| WO | 2005062652 A1 | 7/2005 |

OTHER PUBLICATIONS

3rd Generation Partnership Project. "General Packet Radio Service (GPRS) Enhancements for Evolved Universal Terrestrial Radio Access Network (E-UTRAN) Access." 3GPP TS 23.401, Dec. 2007, pp. 11-20.
3rd Generation Partnership Project. "Architecture Enhancements for Non-3GPP Accesses." 3GPP TS 23.402, Dec. 2007, pp. 27-29.

* cited by examiner

*Primary Examiner* — Andrew Lee
(74) *Attorney, Agent, or Firm* — Coats & Bennett, P.L.L.C.

(57) ABSTRACT

A method and apparatus for selecting an edge node from a plurality of edge nodes in a fixed access communications network. A selection node receives from a host entity a request for a network service. The selection node then obtains, from at least one further network node, data relating to a plurality of edge nodes. On the basis of the retrieved data, the selection node selects an edge node from the plurality of edge nodes, wherein the selected edge node provides a path between the host entity and the requested network service. The selection node then sends a response to the host entity, the response including information identifying the selected edge node.

12 Claims, 6 Drawing Sheets

SELECTION OF AN EDGE NODE IN A FIXED ACCESS COMMUNICATION NETWORK

TECHNICAL FIELD

The present invention relates to a method and apparatus for use in a communications network, and in particular to a method and apparatus for allocating pooled nodes to a host in a fixed access network.

BACKGROUND

Internet networks and mobile communication networks, such as Global System for Mobile communications (GSM) and 3G, use gateway nodes to allow hosts to access communications networks, and server nodes to provide services to the host. Edge nodes such as Access and Service Edge nodes are frequently "pooled" in a network, to allow load sharing and balancing between pool members, along with increased availability and better utilization of resources. Conventionally, pools are either statically configured, and static pooling can also be based on the Domain Name System (DNS).

Statically configured pools are based on the concept of statically pre-configuring information about selectable edge nodes for a given service. Selection algorithms are used to select a suitable edge node for use by a host. Statically configured pools allow for better sharing of the load distribution between nodes having similar functionality, and simplified node dimensioning due to more accurate estimates of traffic over larger geographical areas.

Another type of statically configured pooling is DNS-based pooling. Rather than configuring pools in each node that may require this information, the configuration is performed in a DNS server. A host sends a DNS query to the DNS server, which returns a list of IP addresses identifying members of a pool. The host then selects one address from the list based on an internal selection algorithm.

A refinement of this idea is for the DNS server to introduce limited selection before sending the list of IP addresses to the MS. Examples of these are "sort lists" and "round robins". A Sort List is a DNS feature where the order of addresses in the list of IP addresses are ordered based on the source address of the query. A Round Robin is a DNS feature to balance traffic between two or more addresses. Round Robin is used in General Packet Radio Services (GPRS) networks to distribute the load between multiple Gateway GPRS Support Nodes (GGSNs).

A disadvantage to using Sort Lists in the DNS server is that there is no guarantee that the original order will always be maintained as the information is passed from DNS server to DNS server. To ensure the correct order is maintained, Sort Lists must be configured in all the DNS servers in a network, adding considerable complexity to large DNS solutions. In some cases it may not be possible to set Sort Lists on all servers.

Round Robin operates using static information obtained from a DNS database. The status and actual load on a node are not taken into account when the DNS server responds to a request. Round Robin may override the structure of a response sent from an authoritative server or the effect of a Sort List.

DNS pooling also enables service-specific selection by using so-called "resource records" (RRs). In a basic DNS server described in IETF RFC 1034/1035, pools can be configured with multiple "address" RRs (A RRs) for a given host name. When the DNS server receives a request for a list of addresses, it returns all RRs matching the query, and the entity making the requests then selects an address from the list.

A more enhanced service-based pooling solution is specified in RFC 2782, which describes a SRV RR-enabled DNS server. Server pools are configured using multiple "service" resource records (SRV RRs) for a service. A RR format also includes PRIO and WEIGHT parameters. The DNS server's response to a request contains all possible choices of server with priority and weight info, allowing the MS to make a server selection on the basis of pre-defined rules based on the received priority and weight parameters.

A problem with static pooling is that the pools must be configured and updated at any node that may be affected by changes in the pooling. Pooling membership therefore requires a considerable amount of configuration work. For example, if a network is extended it may require a re-design of existing pools, and possibly the introduction of new members into pools. Re-configuration in affected nodes is therefore required not only to take account of newly introduced pool members, but also existing ones. Similarly, changes in the network topology require operator intervention.

A further problem with static and DNS-based pooling is that it cannot take account of changes in the network without being reconfigured. So, for example, static pooling cannot take account of current network conditions such as the current load on the transport network. The selection process may therefore lead to overload on some pool elements, whilst other pool elements are underutilized. As a consequence, QoS requirements for a given service cannot be guaranteed. Furthermore, the load on pool elements such as edge nodes cannot be taken into account for load sharing purposes. Other characteristics of the pool elements cannot be taken into account either. Such characteristics include connectivity to specific networks, supported services, and so all pool elements must be configured similarly and have all required features in order to avoid selecting a pool element that does not have the required features. Using static or DNS-based pooling, there is no or limited topology information available.

Static pooling makes configuration management of pools cumbersome. For example, in a scenario where less expensive, and therefore less reliable pool elements are used, network redundancy provided by pooling would allow for high network reliability. In this scenario, however, adding and removing pool elements to/from pools may become a frequent event, affecting configuration significantly.

SUMMARY

The inventors have recognized the problems associated with static and DNS-based pooling methods, and devised a method and apparatus to mitigate those problems.

According to a first aspect of the invention, there is provided a method for selecting an edge node from a plurality of edge nodes in a fixed access communications network. A selection node receives from a host entity a request for a network service. The selection node then obtains, from at least one further network node, data relating to a plurality of edge nodes. On the basis of the retrieved data, the selection node selects an edge node from the plurality of edge nodes, wherein the selected edge node provides a path between the host entity and the requested network service. The selection node then sends a response to the host entity, the response including information identifying the selected edge node. In this way, the host entity need not make a choice of which edge node to select, but is provided with the identity of a selected node based on the selection node's best choice.

Optionally, the edge node is one of a service edge node and an access edge node. The data relating to the plurality of edge nodes is optionally retrieved from a database, and the data comprises information relating to the status and capabilities of each edge node from the plurality of edge nodes. In this way, the selection node can make a selection of an edge node on the basis of an edge node's properties. The database is optionally dynamically updated as the capabilities and status of each edge node of the plurality of edge nodes change, which allows edge nodes to be changed, removed, upgraded or added.

The data relating to the plurality of edge nodes is optionally retrieved dynamically by determining network conditions, the network conditions being selected from any of the current network conditions on a path between the host entity and the edge node, a transport capacity on a path between the host entity and the edge node, and topology information identifying a location of each edge node of the plurality of edge nodes. In this way, the selection node can use the current network conditions when making a selection of an edge node.

As an option, the selection node retrieves an address for each edge node of the plurality of edge nodes from a Domain Name Server, in order to provide the address of the selected node to the requesting host entity.

The request is optionally selected from any of a Domain Name System message, a Dynamic Host Configuration Protocol message, and an authentication request forwarded from an Authorization, Authentication and Accounting server. Where the request is a DNS message, less "translation" of messaging is required.

The retrieved data optionally comprises information selected from any of a location on the network of each edge node, routing information for each edge node, current load on each edge node, current capacity of each edge node, security information relating to each edge node, services available from each edge node, subscription information relating to a user or the host, type of attachment to the network, and operator policy information. Any of these features can be used when selecting an edge node.

The response to the host entity optionally comprises an IP address of the selected edge node.

The communications network according to the first aspect is optionally is a System Architecture Evolution or Long Term Evolution network.

According to a second aspect of the invention, there is provided a selection node for use in a communications network. The selection node is provided with a receiver for receiving from a host entity a request for a network service. The selection node further has means for obtaining, from at least one further network node, data relating to a plurality of edge nodes, and means for selecting, on the basis of the retrieved data, an edge node from the plurality of edge nodes. The selected edge node provides a path between the host entity and the requested network service. A transmitter is also provided for sending a response to the host entity, the response including information identifying the selected edge node.

The means for retrieving data optionally comprises means for retrieving data from a plurality of further network nodes, such as databases.

The selection node optionally further comprises means for selecting an edge node on the basis of any of a location on the network of each edge node, routing information for each edge node, current load on each edge node, current network conditions on a path between each edge node and the host entity, current capacity of each edge node, security information relating to each edge node, services available from each edge node, subscription information relating to a user or the host, type of attachment to the network, and operator policy information. Any of these data can be used by the selection node to optimize the selection of an edge node.

The selection node optionally is provided with means to include an IP address of the selected edge node in the response to the host.

DETAILED DESCRIPTION

The following description sets forth specific details, such as particular embodiments, procedures, techniques, etc. for purposes of explanation and not limitation. In some instances, detailed descriptions of well known methods, interfaces, circuits, and devices are omitted so as not obscure the description with unnecessary detail. Moreover, individual blocks are shown in some of the drawings. It will be appreciated that the functions of those blocks may be implemented using individual hardware circuits, using software programs and data, in conjunction with a suitably programmed digital microprocessor or general purpose computer, using application specific integrated circuitry, and/or using one or more digital signal processors.

Figure 1:
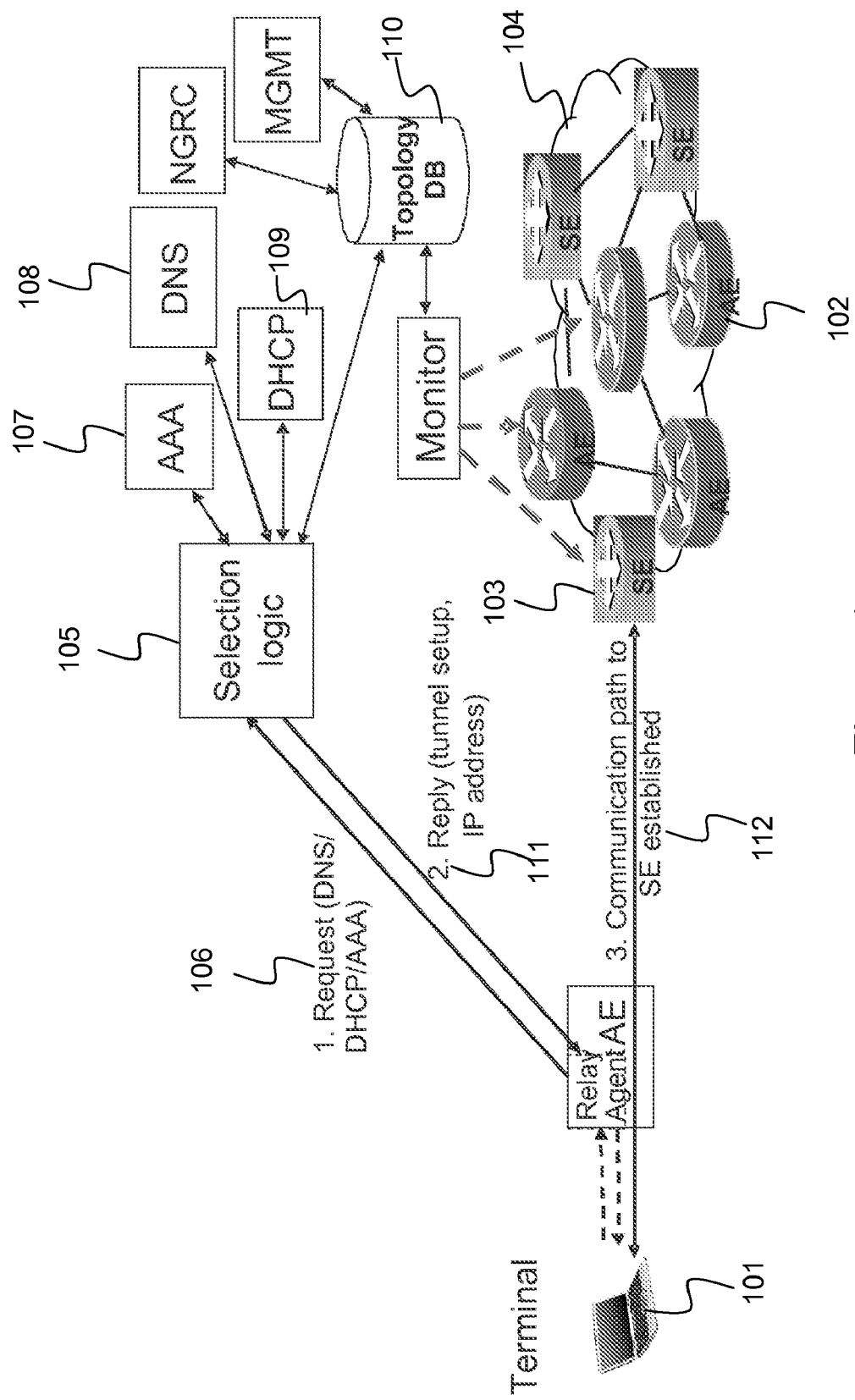
FIG. 1 illustrates schematically in a block diagram a network architecture and signalling according to an embodiment of the invention.

Referring to FIG. 1 herein, when a host 101 is attached to a fixed access network, and requires service from an Access Edge (AE) or Service Edge (SE) node, the most appropriate AE 102 or SE 103 node for the host to use is selected from a pool 104 of AE/SEs. The selection is based on subscription-related information (requested service type, required QoS, etc.), and also on the status (load and reachability) of AE/SEs, transport link capacity information, topology information (AE/SE locations on geographical and logical topology, and current terminal location) and the capabilities or functionalities of different AEs/SE members within the pool 104. Examples of capabilities and functionalities include supported features (e.g., security support, supported tunnel types etc.) and the type of interface to services (e.g., Internet peering, VPN, IMS etc.). This nomadic access to network services allows for session continuity if needed.

A central entity is provided to make the selection of the AE 102 or SE 103 from a pool. This entity is referred to as selection logic 105. When the selection logic receives a request 106 for a service from the host 101 (or on behalf of the host 101), the selection logic 105 selects the most appropriate endpoint for the host based on the above criteria and establishes communication between the host and selected AE 102 or SE 103. The selection logic 105 communicates with a plurality of data sources to obtain data on which to base the selection. The selection logic 105 may make queries on-demand (i.e., triggered by the request), and may also issue queries to data sources independently in advance, in order to shorten response time. Examples of data sources that the selection logic 106 may use include an Authorization, Authentication and Accounting (AAA) server 107, a DNS server 108, a Dynamic Host Configuration Protocol server 109, and a topology database 110.

Once the selection logic 105 has selected a server it sends a reply 111 to the host 101 (or agent acting on behalf of the host), and in the reply 111 includes an identity of the selected AE 102 or SE 103. In the example shown in FIG. 1, the selection logic 105 has selected SE 103, and the host 101 uses the identity of the SE 103 to establish a communication path 112 between the host 101 and the SE 103.

Figure 2:
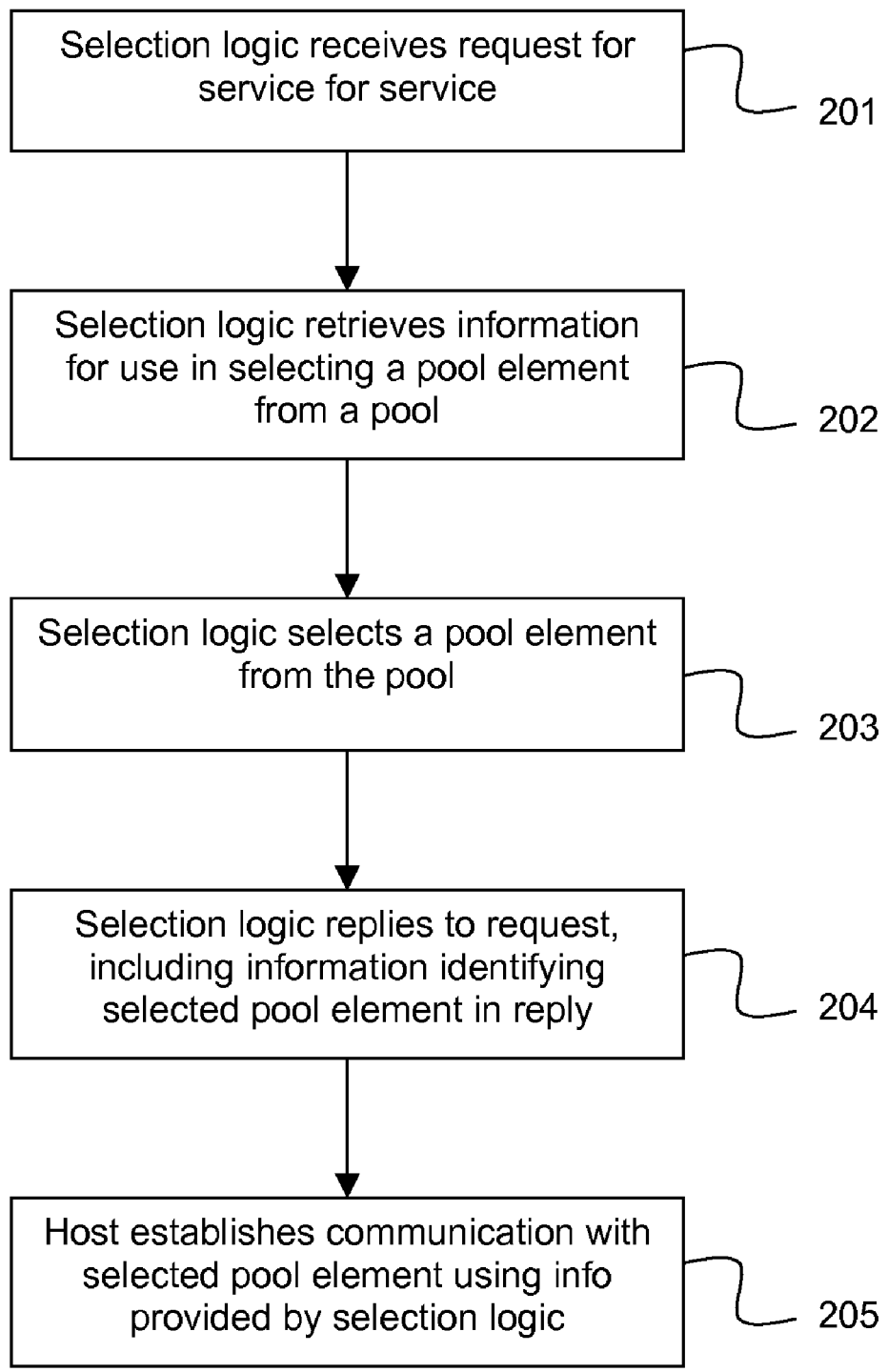
FIG. 2 is a flow chart illustrating the basic steps an embodiment of the invention for selecting a node.

FIG. 2 is a flow chart showing a method of a method for selecting the most appropriate edge node from a plurality of edge nodes based on the service information, status and capability/functionality of the nodes as well as transport information. The following numbering refers to the numbering of FIG. 2:

201. The host 101 makes a request 106 for service to the selection logic 105.
202. The selection logic 105 retrieves information from various sources for use in selecting a pool element from a pool. A pool element is used herein to refer to an endpoint such as an AE or SE belonging to a pool of AE/SEs.
203. On the basis of the retrieved information, the selection logic 105 selects a pool element from the pool.
204. The selection logic 105 sends a reply 111 to the request, the reply including an identity (for example, an IP address) of the selected pool element (in this example, SE 103).
205. The host 101 establishes a communication path to the selected pool element, in this case SE 103.

Turning now to more detail and specific embodiments of the invention, the request for service is based on any type of signalling capable of exchanging the required information. However, for a network-based selection it is assumed that there is no application-specific protocol for selection. Three of the more important possibilities are a DNS query, a Dynamic Host Configuration Protocol (DHCP) query, and an AAA request. Taking each in turn:

DNS Query

If the host already has an IP address, the service request can be made using a DNS request. An advantage of DNS is that DNS is supported by vast majority of IP hosts, so the impact on requestor functionality is low. For example, a Windows® host may be configured with server Fully Qualified Domain Names (FQDNs) for a given network connection, in which case they will initiate the connection with a DNS query. Furthermore, standard DNS features for service-specific pooling may be exploited in a natural way without greatly altering DNS.

In the DNS query, a service identification can be based in the usual way on a string encoded into the FQDN of the query, e.g., _inet.tcp.example.net, where _inet denotes the given service, e.g., an Internet connection.

DHCP Query

In this case the 'request' comes in the form of a DHCP query. This embodiment supports the selection of proper gateway or IP POP for a non-3GPP terminal (e.g. PDAs, laptops) attaching to the network. When such a terminal attaches to an L2 access point, it sends a DHCP request to the DHCP server asking for configuration information to be used on the new link. This can be thought of as a trigger then a specific request for service.

According to this embodiment of the invention, every DHCP request from each IP subnet in the network is relayed to the selection logic 105 deployed somewhere in the operator's network. Therefore, access routers must be provided with DHCP relay capability. After the selection process the DHCP reply is further relayed to a DHCP server that finally allocates an IP address to the terminal. This may coincide with the selected IP POP for the given terminal and service. As a design option, the Selection logic may be implemented in an enhanced DHCP server.

The terminals can move from one access to another so it is important to identify their actual location. This can be based on the IP address of the first DHCP server's IP address relaying the DHCP query. The Service identification can be based on interfacing to a data source that can relate the Terminal to the subscribed services. For example, to an AAA server that knows the service subscription information.

AAA Request

According to an alternative embodiment, an Authentication-based request is sent to the selection logic 105. If the host 101 is equipped with layer two authentication capabilities such as 802.1x (e.g. WPA in wireless LAN cards), the host 101 must authenticate itself each time it attaches to an access point. Generally, the authentication is forwarded to an AAA server 107 that knows the service subscription information and can authenticate the terminal. (This is the case e.g., for 802.1i.)

The selection logic 105 oversees the authentication process between the AAA server 107 and the host 101 and thus notices the attachment of the host 101 and performs the selection needed. As before, the host location can be identified from the authenticator's IP address (the AAA server 107 at the access edge relaying the authentication request). The service identification is based on interfacing to a AAA or HSS server.

Turning now to the parameters for selection, end points such as AEs and SEs can be based on different selection parameters, as described below:

End-points can be selected based on a type of service available from the endpoints. This simplifies the overall network structure compared to providing, for example, a single AE for all services. Furthermore, it allows optimization of individual AEs for a given service.

Services from an AE or SE may be provided to a nomadic host. When a user moves location, and session connectivity is not required, a new AE or SE is selected on the basis of topology information. The optimizes the transport path compared with maintaining the same AE/SE.

A user may change location when accessing a home or corporate Virtual Private Network (VPN). When a user changes location an endpoint connecting to the VPN is reselected on the basis of endpoints connected to the corporate VPN, or on the basis of topology. Note that some means to infer which endpoint is connected to the VPN is required. There is no need to support Mobile IP in this scenario as session continuity is not required.

It may be required to select a new AE/SE as a result of failure of an AE/SE to which the terminal was previously attached. A new AE/SE is then selected in order to maintain the service.

In the scenario in which a network has been extended, if AE capability and topology is distributed, then when, for example, a new VPN is added, the "closest" VPN to the access network can be automatically selected (as illustrated by the solid line)

AE/SE selection may be required in a wholesale network model. Tunnel end point selection is based on topology information. For example, an AE may provide the shortest path to a particular Service Provider Tunnel endpoint selection can also be based on connectivity information, e.g. an L2TP connection may only be available to the Service Provider via an alternative AE.

In a roaming scenario, the selection of an end point may be based on BGP policies such as a preferred IP address range on a given IX. Policies may therefore result in the selection of an AE that may not necessarily provide the shortest path.

In a second roaming scenario, an AE is selected on a "Subscription-impacted" basis. This is not controlling by BGP policies, but may be based, for example, on Quality of Service (QoS) capabilities of the transit network that will be used by the selected AE.

In a third roaming scenario, a peering point selection in the visited network considers the possibility of anchoring to different AEs in the home network. This may be based on operator policies, which may be along the lines of "keep traffic in the home network for a long as possible.

In a large access network, end-points may be selected based on the type of service, AE availability and network topology.

An end-point may be reselected due to the user moving, and session continuity is required. The terminal maintains its original IP address and requires mobile network support, and so the same anchor is re-selected when a new AE is selected.

From the examples described above, the types of parameters and situations required for AE/SE selection can be grouped into the following categories:

IP gateway selection during attachment to network with direct access to services (initially the terminal does not have IP address). This applies to Internet access and home/corporate VPNs.

IP gateway selection and server selection during access to services (initially the terminal has temporary IP address). This applies to VoD, TV/radio broadcast, TSTV, and IMS registration.

Server selection during access to services (the terminal has fixed IP address). This applies to IMS services and IP telephony (SIP-based).

Dynamic reselection of gateway triggered by network events or by terminal mobility. This applies to Internet access, home/corporate VPNs, end-point reselection during mobility with session continuity.

End-point/tunnel reselection during access to specific services (terminal will get new IP address). This applies to IMS services with specific policy and QoS control.

The major benefits of the selection process include:

Enhanced network resilience: Pooling provides an inherent redundancy among the nodes with the same functionality in the pool.

Reduced cost: Pooling relaxes the HA requirement of AEs without compromising the reliability of the network, allowing the use of cheaper AEs, and the relaxation of the requirement to duplicated AEs per site. Furthermore, fewer AEs with a certain capability are required, and no MIP support is required for roaming or nomadic scenarios. Transport usage is made more efficient. Load balancing allows a reduced number of AEs and servers. The AE design for multi-edge cases can be optimized.

Reduced management complexity, which results in a reduction in Operational Expenditure. Dynamic distribution of AE information such as type, location and capability, and the gateway selection process, allows for automated selection of proper AE/peering point based on subscriber information, operator policy, QoS capability of peering network, etc., and network deployment and transition in the event of a failure are improved. Furthermore, simpler network dimensioning can be performed, as the pool covers larger areas with lower traffic fluctuation Examples of parameters that can be taken into account and that can be derived from the scenarios are:

Topology related parameters, such as SE locations on physical/logical topology and current terminal (AE) location Performance related parameters, such as load information on SEs, "Up-and-running" SEs, and free capacity on transport links Capability/Functionality related parameters (SE), such as supported features (e.g., security support), interface to services (e.g., Internet peering, VPN, IMS), and content on the service such as a movie Subscription related parameters, such as the service type (e.g., Internet, VPN access, telephony, bundled services), QoS-info (e.g., gold/silver/bronze service), and other subscription info (e.g. FW settings)

Nomadicity related parameters, such as attachment type (mobile or not)

Figure 3:
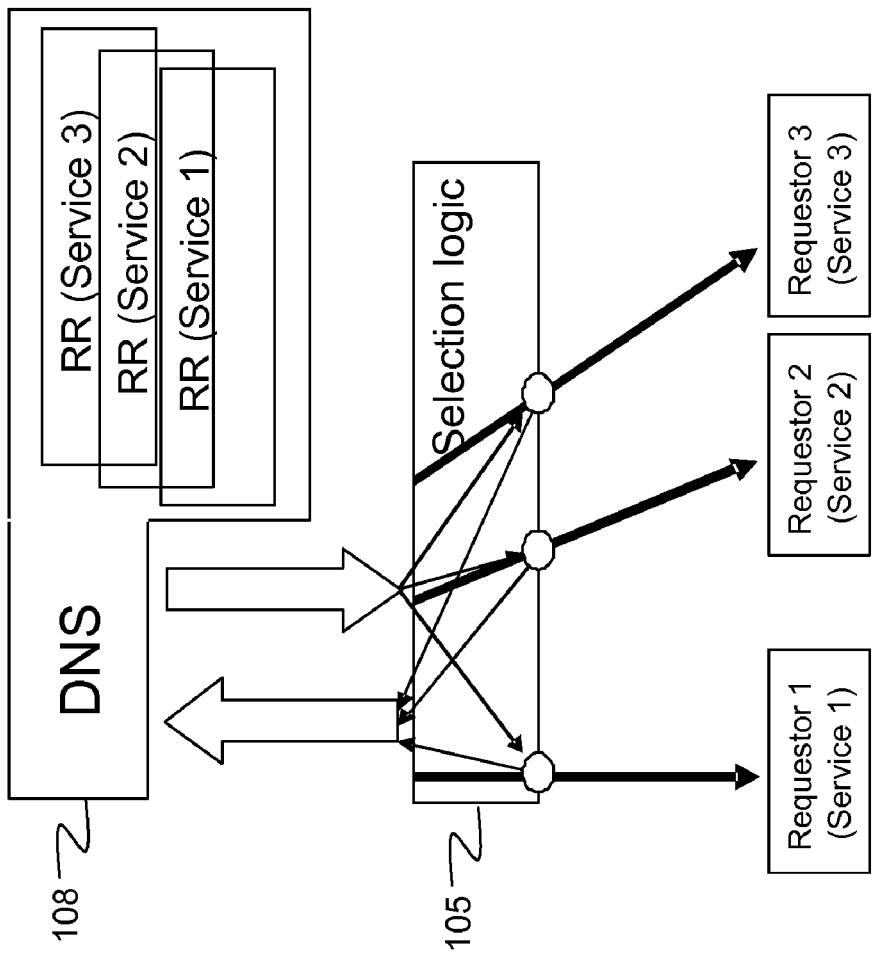
FIG. 3 illustrates schematically in a block diagram the signalling between a requestor and selection logic according to an embodiment of the invention.

In order to identify a server or gateway pool for service, and the IP addresses of each pool member, any suitable signalling may be used. DNS signalling is most suitable, and in this case a standard DNS server is used as the data source. Configuration of the DNS server with a list of selectable pool entities for each service is done by the network management system. Referring to FIG. 3, pool identification comprises the following steps:

A request arrives from the requestor to the selection logic 105;

The selection logic 105 infers the Terminal and Service parameters as described in the previous section, and then issues a standard DNS query to a DNS server 108 specifying the Service required.

Resource records corresponding to the different services are configured in the DNS server 108. Based on the Service specified in the request, the record elements corresponding to the Service including their IP addresses are returned to the selection logic 105 in a DNS-answer.

The selection logic 105 makes the selection from the pool based on the different criteria and creates and sends a response to the requestor. The response comprises a single IP address of the selected node.

It is advantageous if the initial request to the selection logic 105 is also in a form of a DNS query. This is because, in general, this request may simply be forwarded by the selection logic 105 to the DNS server 108 with little or no modification of the original request. It is also faster to filter out the most appropriate entry from the answer from the DNS server 108 and transfer it to the requestor. This reduces the response time.

The selection logic 105 may be embedded within the DNS server 108, which reduces response time even further, although the selection logic 105 may be a separate node from the DNS server 108.

As described above, it is also useful to identify topology information, as well as status, capability and functionality of each pool member. One way to achieve this is to provide a topology database 110 that is dynamically updated. The selection logic 105 consults the topology database 110 to find the closest servers/gateways, transport capacity and node status/load information etc. The topology database 110 can be a standard relational database that may be built into the same box as the selection logic 105 but may also be a separate node.

Figure 4:
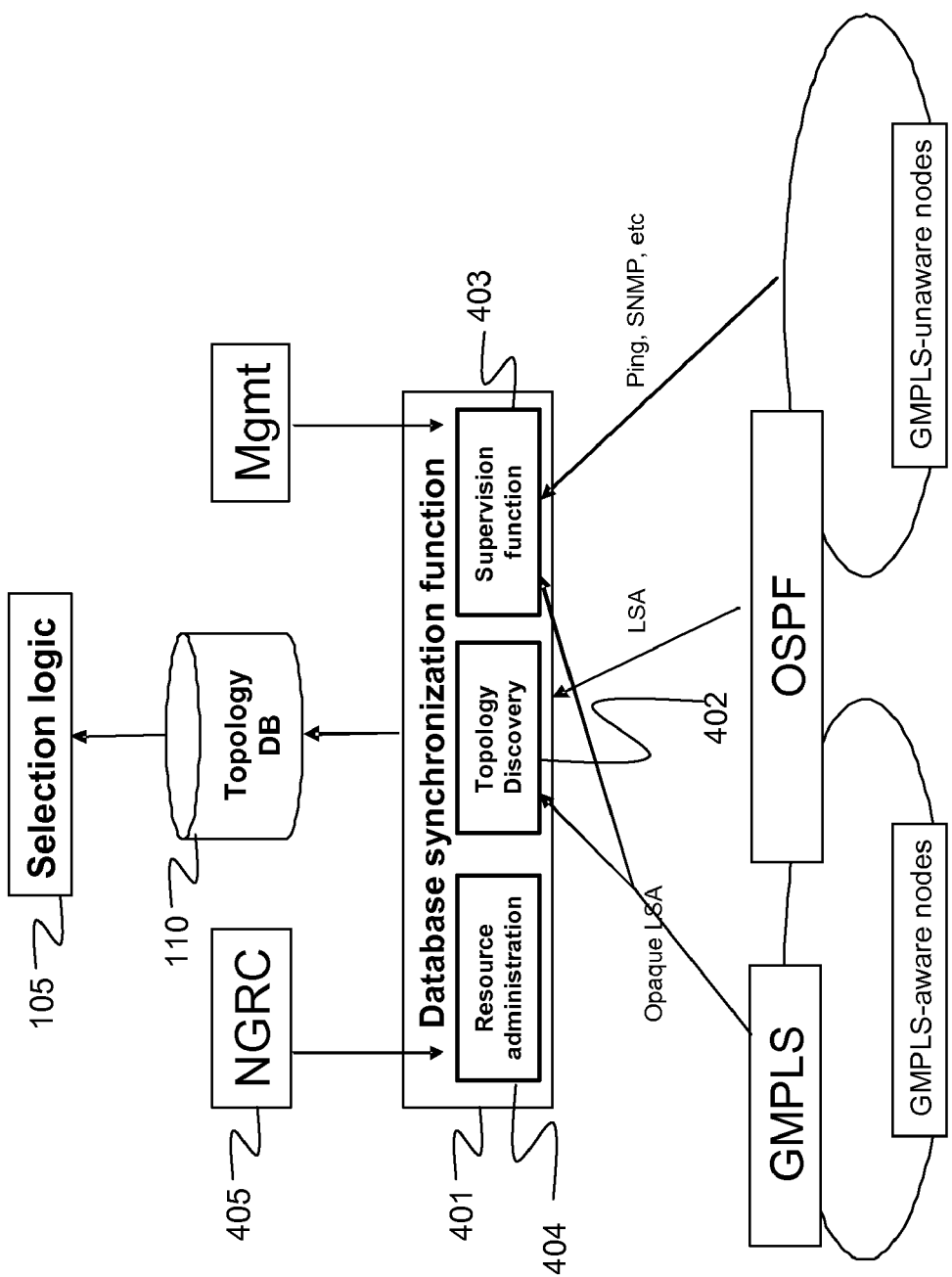
FIG. 4 illustrates schematically in a block diagram an architecture of a network including a Database synchronization function according to an embodiment of the invention.

Initial configuration of the database 110 may be performed by a management system. In order to keep the topology database 110 updated, a Database synchronization function 401, as illustrated in FIG. 4, is proposed. The Database synchronization function 401 has the following main functions:

- A topology discovery function 402 retrieves routing topology and link/router status information by listening to OSPF advertisements sent by network routers. Servers and gateways can either communicate their position on the topology to the topology discovery function 402, or this information can be provided by a network management system.
- A supervision function 403 is responsible for obtaining the status, capability (e.g., VPN configuration), functionality (e.g., security gateway) and load information of transport nodes as well as pool members. The supervision function 1503 may either interface directly with the relevant nodes or obtain the required information from a management system that polls the network.
- A resource administration function 404 administers the transport resources in the network. It is pre-configured by the network management system based on operator policies, SLA information, etc. In order to exchange resource information, the resource administration function 404 may interface with a Next-Generation Resource Control (NGRC) function 405, i.e., another logical entity in the network that is in charge of resource management in certain parts of the network (e.g., A-RACF in fixed access).

The database synchronization function 401 dynamically updates the topology database 110 to reduce the risk that any information extracted from the topology database 110 is out of date. The database synchronization function 401 either updates the topology database 110 periodically, or whenever the database synchronization function 401 detects a change in the network or network nodes that it is monitoring.

In order to select the most appropriate pool element from the pool, specific selection algorithms are required. The selection algorithm is typically different for control plane (server) or user plane (gateway) element selection.

Once the pool element has been selected, it is returned to the requestor. In the case of a DNS query, a single IP address of the selected pool element is returned in the DNS response. In the case of a DHCP query, the DHCP reply contains the IP address of the selected element as the default gateway. In case of an AAA query, the IP address of the selected element is not contained in the AAA answer. Instead, since each authentication process is followed by a DHCP request in order that the terminal acquires an IP configuration, the IP address will be given in the DHCP answer, similarly as for the case with the DHCP query.

In order to illustrate some of the above features of the invention, and by way of an example, consider the case in which an endpoint provides Home VPN access service for nomadic terminals (NTs) across different access types: home (ATM, Ethernet, wholesale provider), mobile (i.e., cellular accesses) and Internet, i.e., from the coverage of a neutral Service Provider. A terminal attached to a VPN service from the Internet. It is assumed that the Access Node (AN) is owned by another service provider that has no service-level agreements with the home provider of the subscription. Thus, the terminal may be provided with a public IP address from this provider, but no authentication is possible through the AN, and also no DHCP relay or special tunnelling is possible from this AN.

Since there is no support from the access side, the terminal must initiate attachment to the VPN service. Also, the terminal needs to handle mobility in some way. Once the terminal has obtained a local IP address with DHCP, it initiates a MIP registration request towards the endpoint (which is the MIP HA). The endpoint interrogates the AAA server for authentication and a repository (LDAP) server for other service-specific information (NAT/FW settings), and then replies with a MIP registration reply specifying a CoA that is in the address range of the customer's home VPN.

Figure 5:
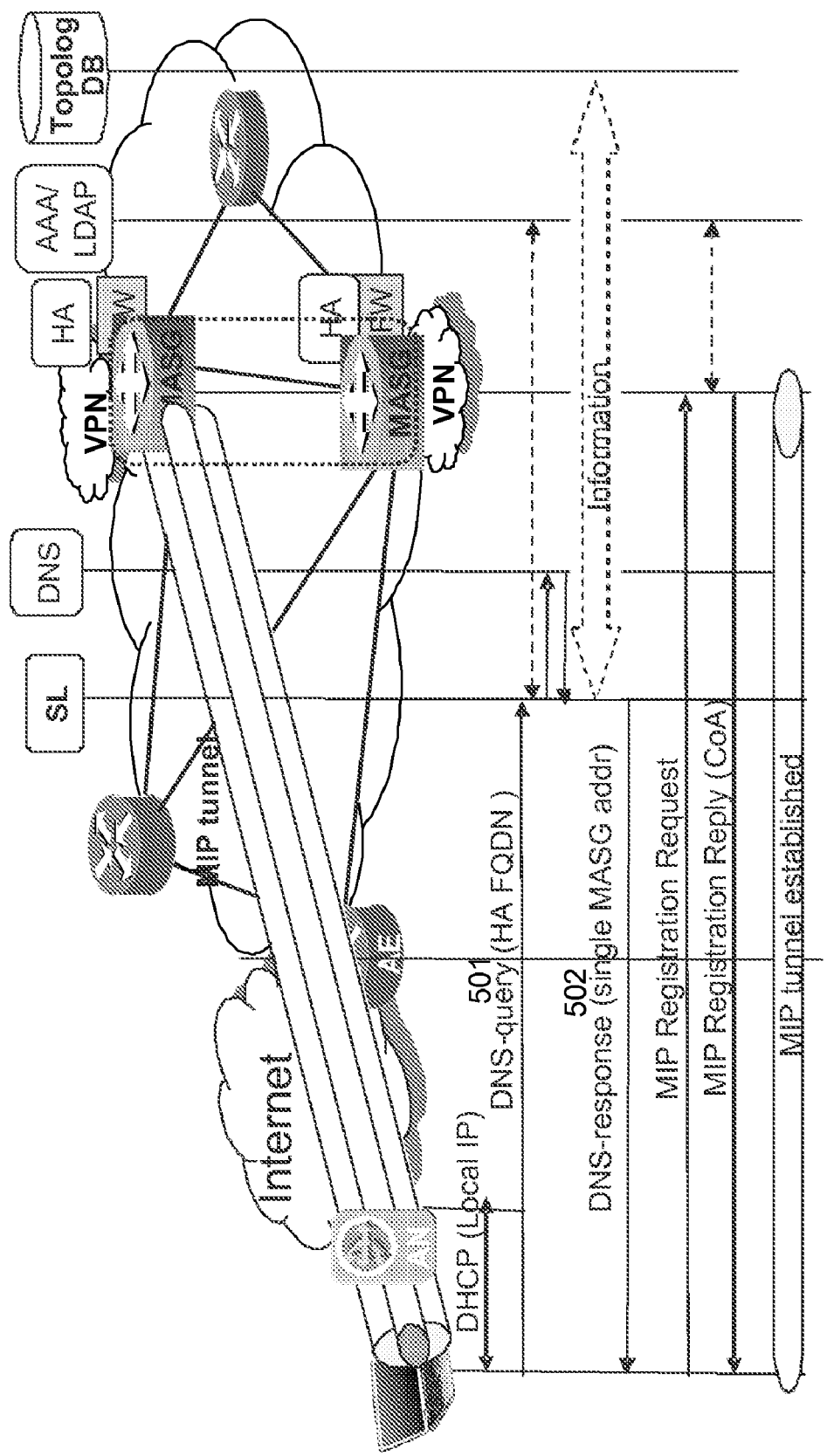
FIG. 5 illustrates schematically in a block diagram a signalling sequence including network-based endpoint selection according to an embodiment of the invention.

The proposed modification into this sequence including network-based endpoint selection is illustrated in FIG. 5. The terminal issues a DNS request 1501 before initiating the MIP registration request. The network is configured such that this request reaches the Selection Logic (SL) that infers the service type using FQDN filtering. The SL then issues an AAA request for authentication and contacts the LDAP server for QoS information. It then contacts the DNS server to find potential endpoints for this VPN service. Using IP address filtering the SL infers the peering (AE) to the given AS the terminal currently resides. It also has an interface to the topology DB for other topology and performance-related information. Based on these information elements, it selects the most appropriate endpoint and replies to the terminal with a DNS response 502 containing the IP address of the selected endpoint.

Figure 6:
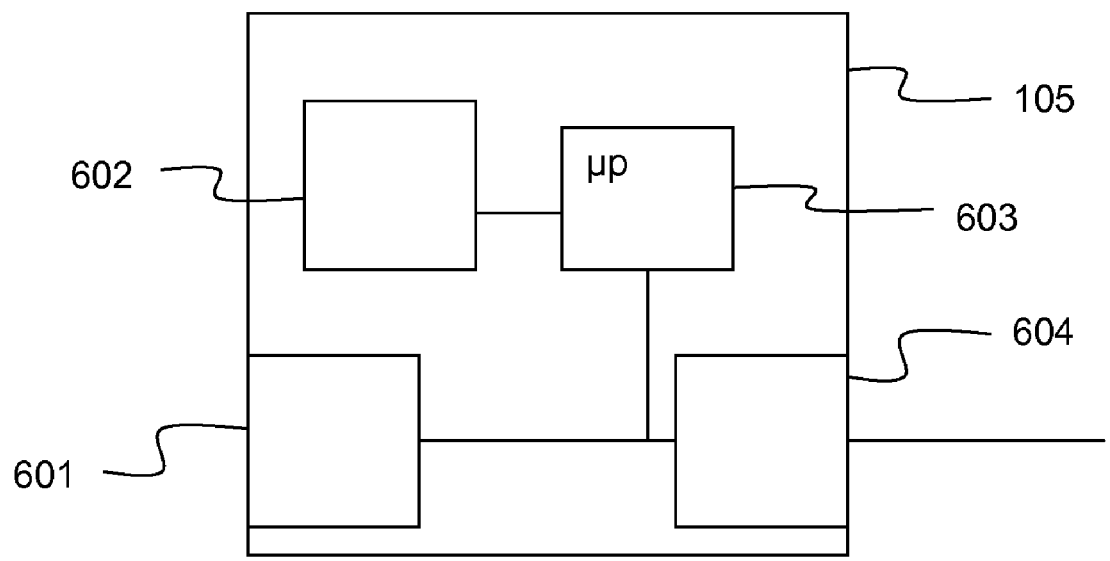
FIG. 6 illustrates schematically in a block diagram a selection function node according to an embodiment of the invention.

Referring to FIG. 6, there is illustrated schematically a selection node for use in a communications network. The selection node comprises a receiver 601 that receives a request for a network service. Means for receiving data relating to a plurality of edge nodes is obtained by querying at least one remote node from an obtaining function 602 that is capable of querying remote nodes and receiving responses from the remote nodes. A processor 603 is provided for selecting, on the basis of the obtained data, an edge node that provides a path between the host entity and the requested network service. A transmitter 604 is also provided for sending a response to the host entity that made the original request, the response providing information identifying the selected edge node. It will, of course, be appreciated that the selection node may have a separate physical implementation or may be a function provided in another node.

The invention as described above provides several advantages over prior techniques for selecting a pool element from a pool where a terminal attaches via a fixed access network. It provides enhanced network resilience, since any node capable of interfacing with a given service may be selected for all terminals, based on their actual reachability and status. Furthermore, it provides increased network efficiency, as transport usage is made more efficient through a full topology-aware selection. This is especially useful in case of nomadic terminals. Using load balancing of the nodes interfacing with a given service provides not only better characteristics, and using load balancing also reduces the overall number of service nodes that are required for a given service. Pooling allows for an optimized AE/SE design in a multi-edge network.

A specific advantage of the proposed architecture is that it provides a single central logic for selection instead of having the selection logic implemented and configured in different control nodes, which would be the case for application-based selection. This reduces capital and operating expenditure, as there is no need to implement and configure selection-related functionality in all different logical nodes that may be in charge of selection in the network. Operating expenditure reduction is especially manifested in a number of use cases (network extension, maintenance etc.) for which the centralized selection gives better support.

Another advantage of the scheme is that it provides a dynamic selection process, which provides better utilization of core network resources by using load information in the selection, improved response times and characteristics for QoS-sensitive services by choosing the shortest possible user plane path and service node with the lightest load, and selection of a proper node for a given terminal or subscription using dynamically obtained knowledge of node capability and functionality-related information (Ipsec Support, Tunnel Type Support Etc.)

Another advantage is that the proposed interface with the selection logic is based on standard functions (DNS, DHCP, AAA queries), and so significant changes are not required to existing node functions and signalling chains. Almost all IP hosts should support DNS, and so the implementation of the DNS based solution has a minimum standardization impact. This also allows utilizing all standard pooling-related DNS features in a straightforward way, as described in this disclosure.

Although various embodiments have been shown and described in detail, the claims are not limited to any particular embodiment or example. None of the above description should be read as implying that any particular element, step, or function is essential such that it must be included in the claims' scope. The scope of patented subject matter is defined by the claims.

The following acronyms are used in this specification:
AAA Authorization, Authentication and Accounting
AE Access Edge
AN Access Node
CoA Care-of Address
DHCP Dynamic Host Configuration Protocol
DNS Domain Name Service
HA Home Agent
LDAP Lightweight Directory Access Protocol
MIP Mobile IP
MASG Multi-Access Service Gateway
NT Nomadic Terminal
PDA Personal Digital Assistant
POP Point of Presence
SE Service Edge
SP Serviced Provider
VPN Virtual Private Networks

The invention claimed is:

1. A method for selecting an edge node from a plurality of edge nodes in a fixed access communications network, the method comprising:
   at a selection node, receiving from a host entity a request for a network service;
   obtaining, from a dynamically updated database, data comprising information relating to the status and capabilities of each edge node of the plurality of edge nodes;
   on the basis of the retrieved data, selecting an edge node from the plurality of edge nodes, the selected edge node providing a path between the host entity and the requested network service; and
   sending a response to the host entity, the response including information identifying the selected edge node.

2. The method according to claim 1, wherein the edge node is one of a service edge node and an access edge node.

3. The method according to claim 1, wherein the data relating to the plurality of edge nodes is retrieved dynamically by determining network conditions, the network conditions being selected from any of the current network conditions on a path between the host entity and the edge node, a transport capacity on a path between the host entity and the edge node, and topology information identifying a location of each edge node of the plurality of edge nodes.

4. The method according to claim 1, further comprising retrieving, from a Domain Name Server, an address for each edge node of the plurality of edge nodes.

5. The method according to claim 1, wherein the request is selected from any of a Domain Name System message, a Dynamic Host Configuration Protocol message, and an authentication request forwarded from an Authorization, Authentication and Accounting server.

6. The method according to claim 1, wherein the retrieved data comprises information selected from any of:
   a location on the network of each edge node;
   routing information for each edge node;
   current load on each edge node;
   current capacity of each edge node;
   security information relating to each edge node;
   services available from each edge node;
   subscription information relating to a user or the host;
   type of attachment to the network; and
   operator policy information.

7. The method according to claim 1, wherein the response to the host entity comprises an IP address of the selected edge node.

8. The method according to claim 1, wherein the communications network is a System Architecture Evolution or Long Term Evolution network.

9. A selection node for use in a communications network, the selection node comprising:
   a receiver for receiving from a host entity a request for a network service;
   a processor configured for obtaining, from a dynamically updated database, data comprising information relating to the status and capabilities of each edge node of a plurality of edge nodes;
   a processor configured for selecting, on the basis of the retrieved data, an edge node from the plurality of edge nodes, the selected edge node providing a path between the host entity and the requested network service; and
   a transmitter for sending a response to the host entity, the response including information identifying the selected edge node.

10. The selection node according to claim 9, wherein the processor configured for retrieving data is configured for retrieving data from a plurality of further network nodes.

11. The selection node according to claim 9, wherein the processor configured for selecting an edge node is configured to select an edge node on the basis of any of:
   a location on the network of each edge node;
   routing information for each edge node;
   current load on each edge node;
   current network conditions on a path between each edge node and the host entity;
   current capacity of each edge node;
   security information relating to each edge node;
   services available from each edge node;
   subscription information relating to a user or the host;
   type of attachment to the network; and
   operator policy information.

12. The selection node according to claim 9, wherein the selection node is configured to include an IP address of the selected edge node in the response to the host.

* * * * *

UNITED STATES PATENT AND TRADEMARK OFFICE
CERTIFICATE OF CORRECTION

PATENT NO.           : 8,401,028 B2
APPLICATION NO.      : 12/863872
DATED                : March 19, 2013
INVENTOR(S)          : Mihaly et al.

It is certified that error appears in the above-identified patent and that said Letters Patent is hereby corrected as shown below:

On the Title Page, in Item (75), under "Inventors", in Column 1, Line 4,
delete "Enkoping" and insert -- Enköping --, therefor.

On the Title Page, in the Drawing Figure, for Tag "201", in Line 2,
delete "service for service" and insert -- service --, therefor.

In the Drawings

Fig. 2, Drawing Sheet 2 of 6, for Tag "201", in Line 2, delete "service for service" and insert -- service --, therefor.

Fig. 5, Drawing Sheet 5 of 6, delete "Topplog" and insert -- Topology --, therefor.

In the Specification

Column 10, Line 14, delete "1501" and insert -- 501 --, therefor.

Signed and Sealed this
Twenty-fifth Day of February, 2014

Michelle K. Lee
*Deputy Director of the United States Patent and Trademark Office*